May 8, 1962 J. E. GOUIN 3,033,135
AGRICULTURAL IMPLEMENT
Filed Dec. 21, 1956 7 Sheets-Sheet 1
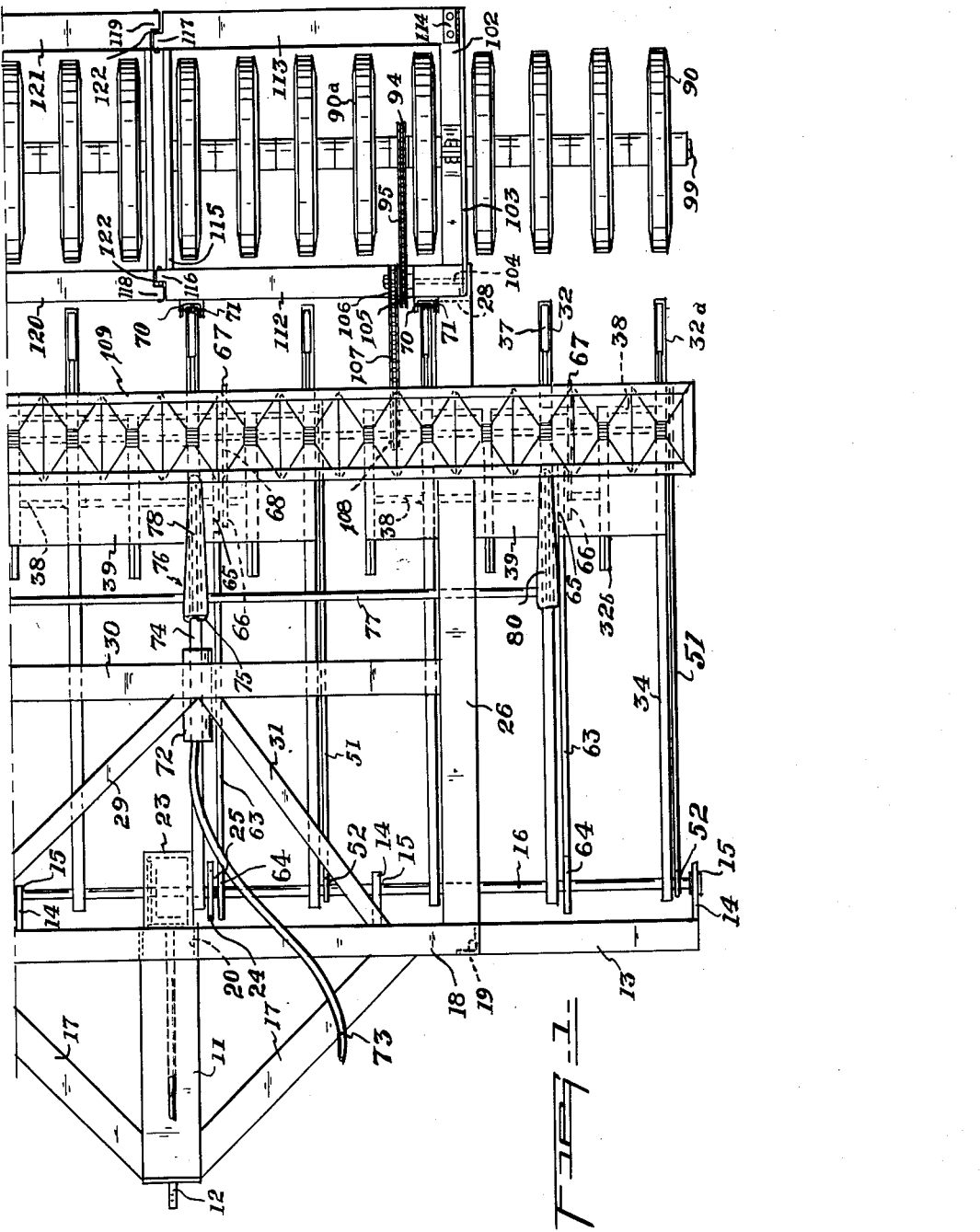
INVENTOR
JOSEPH E. GOUIN
By Fetherstonhaugh+Co.
ATTORNEYS

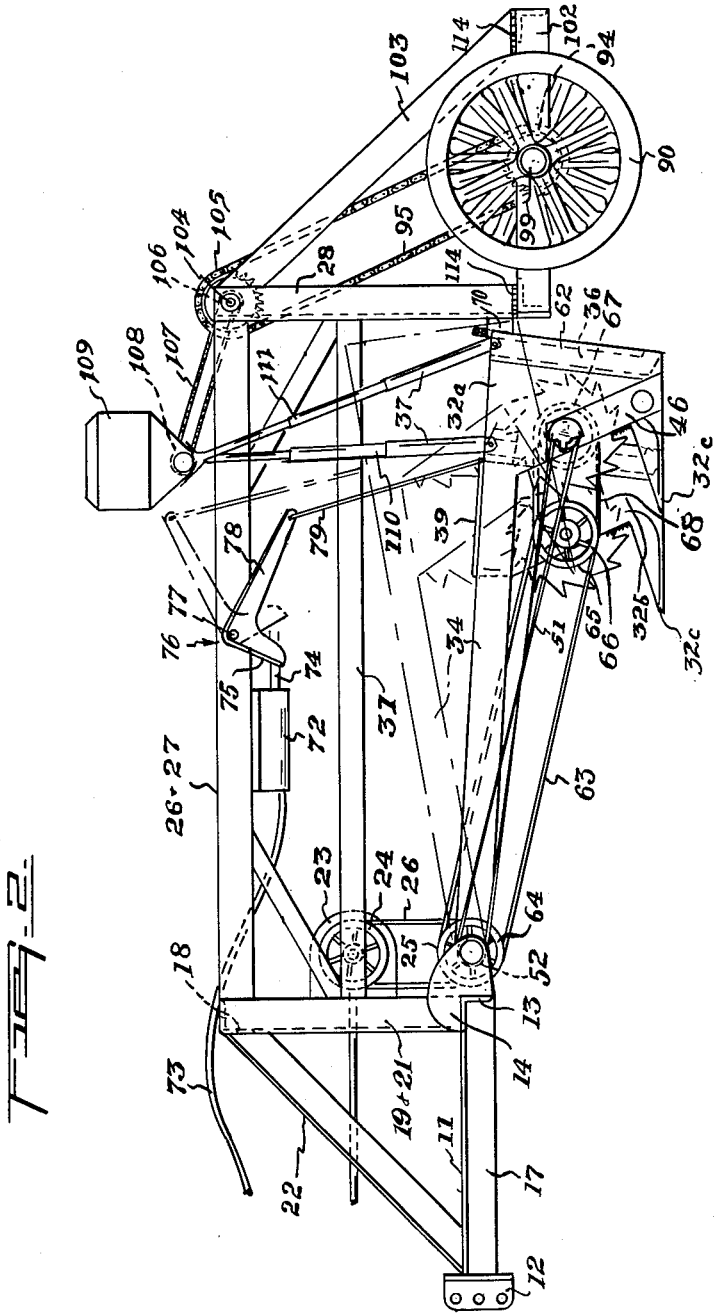

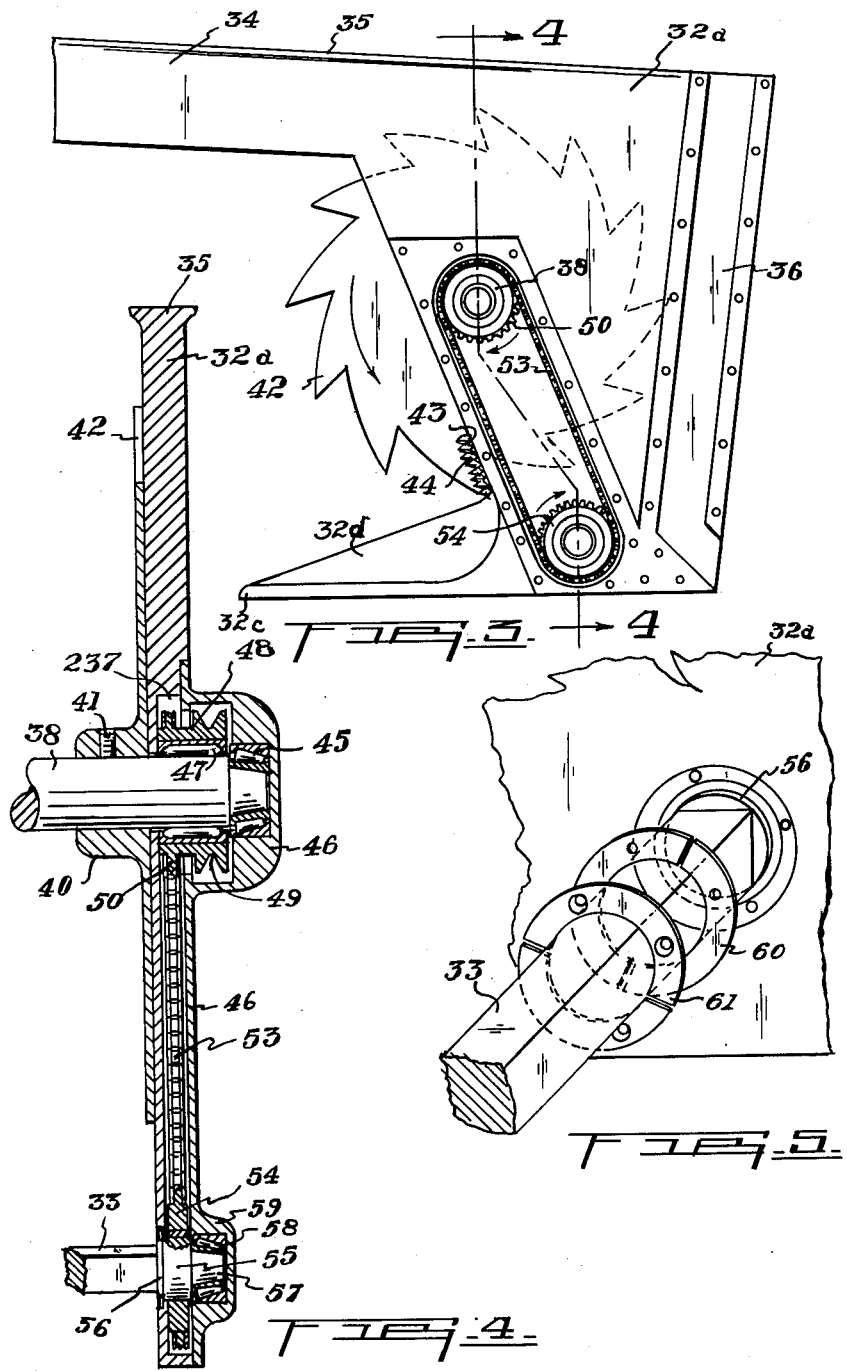

May 8, 1962 J. E. GOUIN 3,033,135
AGRICULTURAL IMPLEMENT
Filed Dec. 21, 1956 7 Sheets-Sheet 4

INVENTOR.
JOSEPH E. GOUIN
BY Fetherstonhaugh &
ATTORNEYS

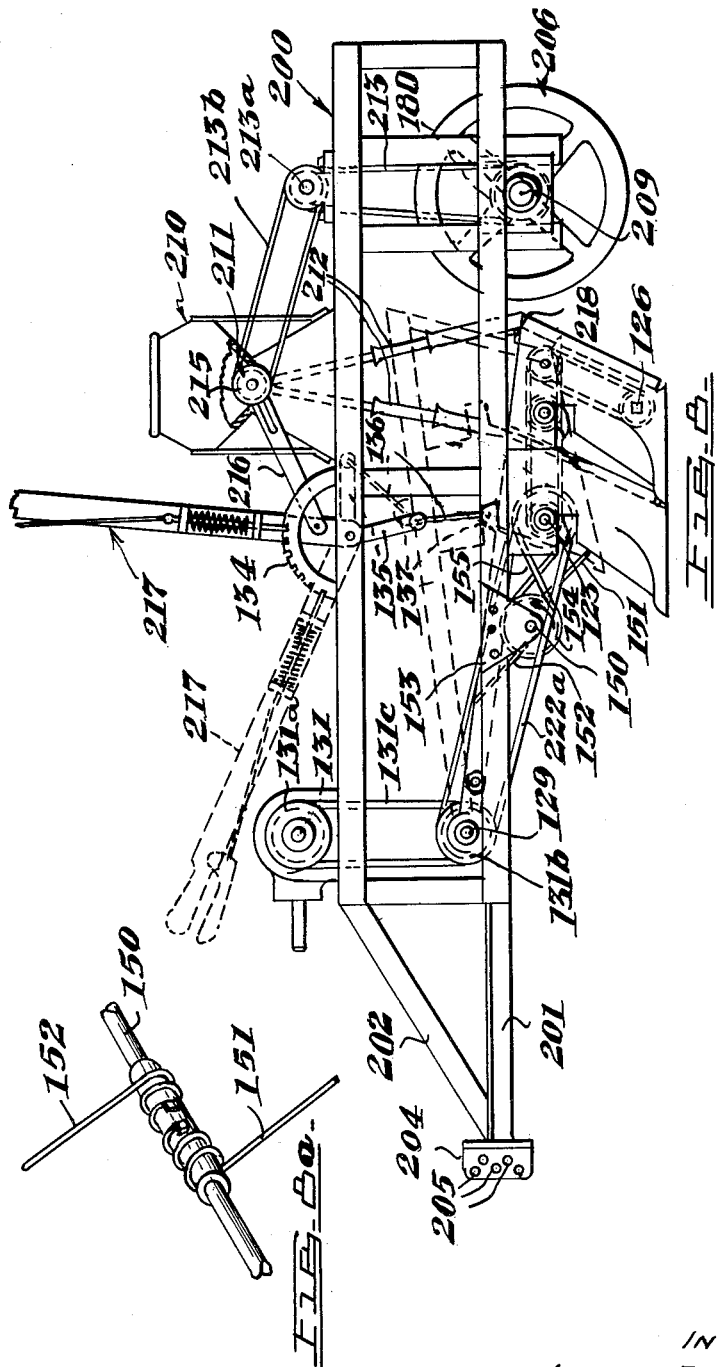

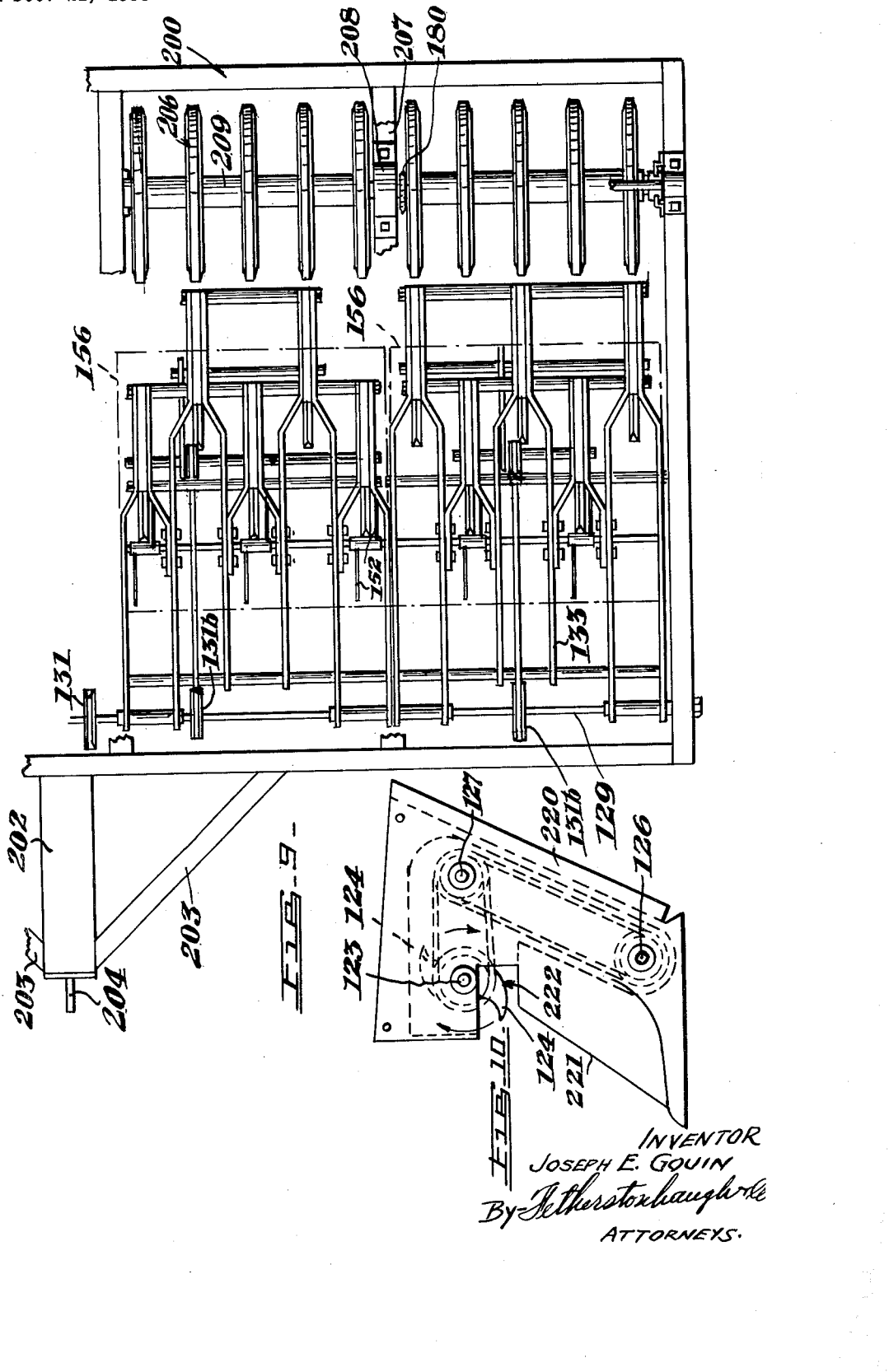

May 8, 1962 J. E. GOUIN 3,033,135
AGRICULTURAL IMPLEMENT
Filed Dec. 21, 1956 7 Sheets-Sheet 7
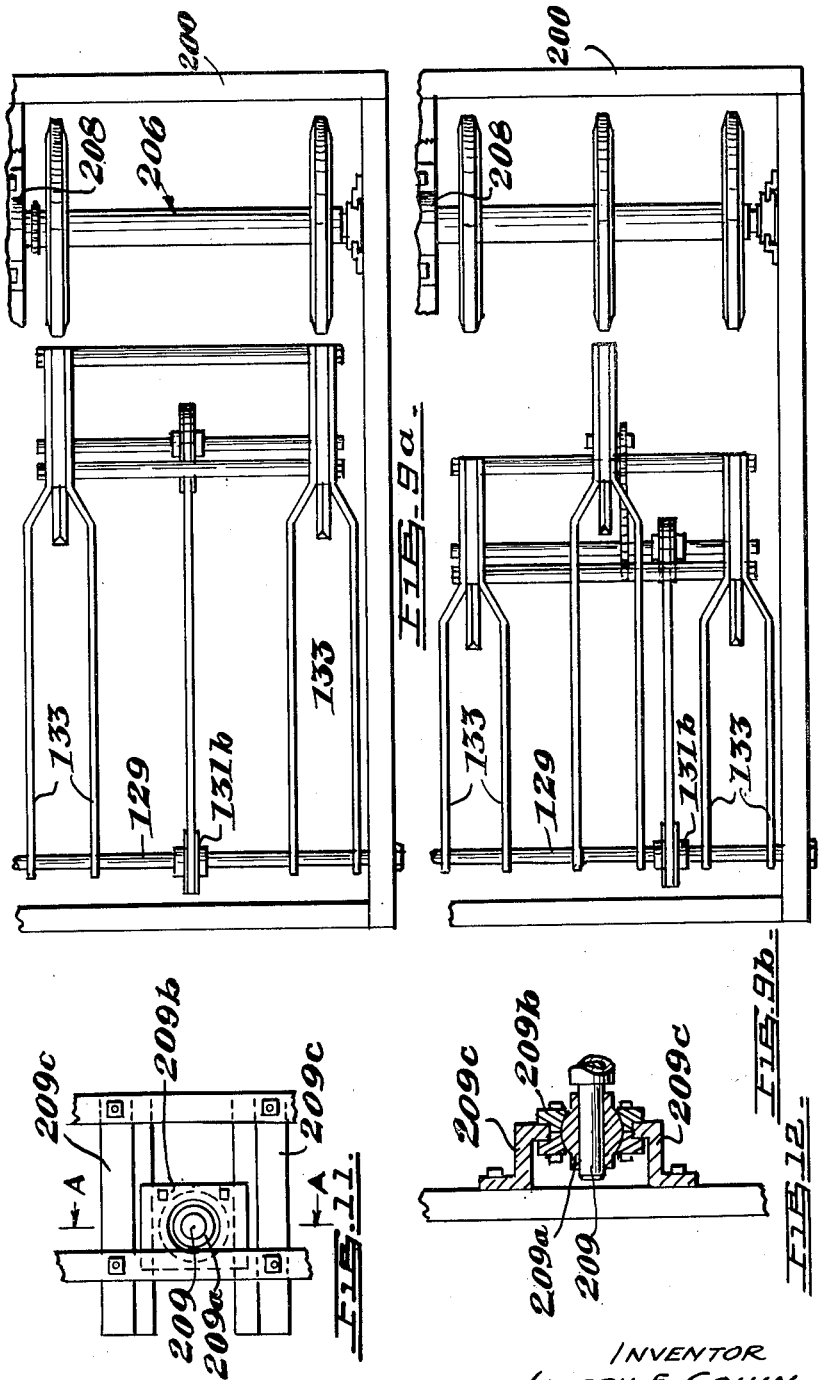
INVENTOR
JOSEPH E. GOUIN
By Fetherstonhaugh & Co.
ATTORNEYS.

United States Patent Office 3,033,135
Patented May 8, 1962

3,033,135
AGRICULTURAL IMPLEMENT
Joseph Elphege Gouin, 1019 Gilford St., Vancouver, British Columbia, Canada
Filed Dec. 21, 1956, Ser. No. 629,983
4 Claims. (Cl. 111—52)

This invention relates to agricultural implements and more particularly to a novel combine for preparing a seed bed, planting the seeds, and packing the planted seeds in one operation. This application is a continuation in part of application Serial No. 610,092 filed September 13, 1956, and now abandoned.

The placing of the seeds at a proper and a uniform depth in a cultivated seed bed has long been recognized as one of the most important factors contributing to successful crop cultivation. In many types of soil, and in particular, in level areas where the soil is heavy and possesses good binding qualities a good seed bed is readily prepared and planted by means of the separate employment of tilling means such as plows and harrows, seed drilling equipment and in some cases packing rollers depending to a large extent upon the moisture content and cohesiveness of the soil which is being cultivated. In areas where the soil is light, the rainfall uneven during the growing season, or the surface of the land uneven, difficulty is experienced in preparing a properly cultivated seed bed without at the same time exposing the loose light soil to wind erosion and also in preventing heavier soil from baking on the surface and thus retarding the normal seed growth. In uneven ground it is difficult to maintain an even depth of seeding, and in all cases where cultivation and seeding are carried out as separate operations, it is difficult to ensure that the seed bed is of uniform depth and that the seed is placed in the proper position in the prepared bed. In northern climates where the growing season is short, seeding to the wrong depth or to an uneven depth or in a seed bed of uneven character as regards its surface condition following the seeding operation can result in pronounced losses of yield.

My invention provides means whereby the preparation of the seed bed, the planting of the seeds, and the packing of the thus planted seeds can be accomplished in the one operation in a manner which ensures that the seed is accurately located in a bed prepared beneath the surface of the soil in a manner such that it is left at the proper depth beneath a packed furrow between unpacked areas of substantially undisturbed topsoil. The implement of the invention includes a frame supported to the rear for movement over the ground by a prime mover connected to the front thereof. A plurality of transversely aligned shoes are connected to the frame and are formed with a plough shaped point for breaking ground. Each shoe comprises a seed chute having a delivery point at the lowermost portion of the rear of the shoe, and a seed box is secured to the frame and connected to the seed chutes of the shoes for delivering seed to them. A tiller bar is rotatably mounted in the shoes and arranged to extend between them, and drive means is provided in one of the shoes for rotating the tiller bar in a direction imparting upward motion to the forward side thereof. The tiller bar is arranged to work beneath the ground surface, so that when it rotates as the implement is being drawn by the prime mover, the ground surface is substantially undisturbed. There is also provided a packing assembly including a plurality of packer wheels, each being mounted from the frame to the rear and in alignment with a shoe member, whereby to pack a strip of ground centered on a furrow cut by the shoe.

Preferably, a knife member is secured to each shoe to extend at an angle therefrom in a posiiton to intercept debris raised by the point, and a toothed blade is rotatably mounted on each shoe for rotation adjacent the knife member to cooperate therewith to cut the raised debris. Drive means is provided in the shoe for rotating the toothed blade.

In a preferred embodiment of the invention, the shoes are arranged in two transverse rows, the shoes of the rows being staggered, and one of the rows being wider than the other. In this embodiment, the tiller bar is preferably mounted to extend between at least the shoes of the wider row.

While the apparatus of the invention is intended primarily to be used as a combine for carrying out the threefold operation of tilling, seeding and packing, it will be appreciated that it may be used to advantage without seeders for soil cultivation either with or without the use of the packer.

The apparatus of the invention makes possible the novel seeding method which consists in cutting a clean furrow to the depth to which the seed is to be deposited, depositing seed in the bottom of the furrow and then mulching the soil at a level between the depth to which the seed is deposited and the surface without substantially disturbing the surface of the soil and then packing along the line of the furrow whereby the seed is left at the required depth beneath a packed furrow and with a bed of prepared mulch on either side. By this method not only is a uniform depth of seeding made possible, but the seed is enabled to draw moisture more readily from the spaces between the furrows while being able to absorb to a greater degree the sunlight impinging on the packed furrow immediately above it. At the same time, the whole seed bed is protected against wind erosion and its resistance to water erosion is greatly improved both by reason of the enhanced absorptive condition of the soil which results from the sub-surface mulching of the bed and by reason of the fact that there is no loose surface area remaining after the packing operation.

The invention and its operation will be more fully understood from a reading of the following detailed description of several preferred embodiments thereof taken in conjunction with the accompanying drawings wherein:

FIGURE 1 is a top plan view of a seeding combine according to the invention;

FIG. 2 is a side view of the combine illustrated in FIGURE 1;

FIGURE 3 is an enlarged detail of one of the shoes of the combine illustrated in FIGURE 1 in which the tiller bar is mounted and provided with its power drive.

FIGURE 4 is a cross-section of the shoe illustrated in FIGURE 3 taken along the section line 4—4 in FIGURE 3.

FIGURE 5 is a fragmentary perspective of the end of the tiller bar showing the sealing means employed between the bar and the shoe in which it is mounted.

FIGURE 8 is a side elevation of a preferred embodiment of the invention with some structural elements left off to show operative detail.

FIGURE 8a is a fragmentary perspective of the tyne mounting of the straw tedder arrangement shown in FIGURE 8.

FIGURE 9 is a partial top plan view of the implement illustrated in FIGURE 8 with the seed-box, main drive and mechanism for controlling the tiller elements left off in order to illustrate the mounting of the tiller assemblies.

FIGURE 9a is a partial top plan of an alternative embodiment showing a shoe arrangement adapted for row crop cultivation.

FIGURE 9b is a partial top plan of a further embodiment illustrating a triple shoe section adapted for cultivation of rough ground.

FIGURE 10 is a detailed side elevation partly in section of a preferred form of shoe element illustrating the drive for the cutter means and the tiller box.

FIGURE 11 is a fragmentary side view of the packer shaft journal arrangement, and FIGURE 12 is a horizontal section through A—A on FIGURE 11.

Figure 6:
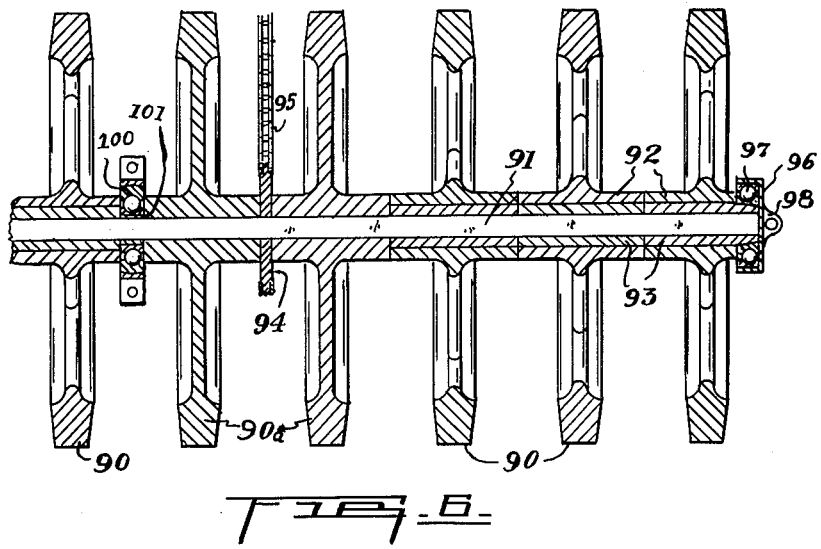
FIGURE 6 is a horizontal section of the packer assembly taken through the centre of the axle and illustrating its construction and the means by which the drive for the seed meter is taken off.

Referring now more particularly to the drawings, the draft bar 11 is equipped at its forward end with the vertical plate 12 which has three alternative holes in it corresponding to three positions in which the draft bar may be shackled to the prime mover. The rear end of the draft bar 11 is secured to the hauling bar 13 to which are welded the brackets 14 which support the bearings 15 on which the shaft 16 is mounted for rotation. The draft bar 11 is supported by the braces 17. The upper frame member 18 is supported on the posts 19, 20 and 21 with the brace 22 being provided between the posts 20 and the draft bar 11.

The power take-off feeds into the gear box 23 which is arranged to apply power to the sheave 24, which latter is arranged to drive the sheave 25 through the V-belt 26. The sheave 25 is secured on the shaft 16 and rotates the latter and various drive sheaves which are fixed on it and which will be discussed later.

The frame is provided at each side thereof with the rearwardly extending elements 26 and 27 which are secured at their rearmost extremities to the rear posts 28. The structure is stiffened by the braces 29, 30 and 31.

Tiller Assembly

In the embodiment illustrated in the drawings, the tiller assemblies consist of six shoes 32, 32a and 32b ganged together in two staggered rows of three shoes each.

The construction of the individual shoe members is illustrated best in FIGURES 3 and 4 which illustrate in detail the structure of the nearside shoe of the rearmost row. The structure of the shoe 32a differs from the structure of the other shoes 32, only in the respect that they contain the mechanism for transferring drive to the tiller bar 33, and then shoes 32b differ from the shoes 32 only in that they do not extend forwardly to connect with the drive shaft.

Referring particularly to FIGURE 3, the body of shoes 32, 32a and 32b is formed of heavy steel plate preferably of the order of 5/8" thick, cut, forged, and machined to provide the forwardly extending portion 34 (except in shoes 32b) with the flange 35 upset along the top edge thereof, the seed chute 36 cut in the rear edge thereof, and adapted to receive the bottom telescoping portion 37 in the top thereof, and the forwardly projecting plough point 32c having the sharpened faces 32d. The forward end of the portion 34 is suitably bored and bushed to provide a rotating fit on the shaft 16 while the shoe is also suitably formed to provide the cavity 237 and borings to accommodate the blade shaft 38 and the tiller bar 33.

As will be seen best from FIGURE 1, the shoes 32 and 32a are ganged together in groups of six by the plates 39 which are welded to the flanges 35. The shoes are placed in staggered rows as illustrated rather than in a single row in order to minimize the tendency of the plough point 32c to drag along the turf situated between adjacent points and leave the ground surface undisturbed. The blade shaft 38 has mounted upon it the rotating cutter blades 40 which are suitably secured, for instance by a grub screw 41. These blades are provided with the teeth 42 and are driven by the shaft 38 in the direction of rotation indicated by the arrow in FIGURE 3. As will be observed, the rotating blades 40 lie immediately adjacent the side of the body of the shoe and there is mounted immediately behind the plough point and in position to cooperate with the teeth of the blades 40 the knives 43 which are secured to the shoes 32, 32a and 32b and are suitably provided with a serrated edge 44. Thus, debris, such as turf, small sticks, straw or trash which is raised by the plough point will come to rest against the knives 44 and be sliced neatly in two by the teeth 42 of the rotating blade 40 so that a clean furrow is made in the ground and no tendency is present for trash, turf or other debris to be dragged along the ground to disturb the surface thereof between the points at which the plough points 32c enter the ground.

The end of the blade shaft 38 is journalled in the thrust bearing 45 which sits in an appropriate cavity formed in the cover piece 46. Rotatably mounted about the end of the shaft 38 on rollers 47 is the double pulley member 48. The pulley member 48 is formed with a V-belt pulley portion 49 and a chain socket portion 50. The V-belt pulley 49 is driven by the crossed V-belt 51 (see FIGURE 2) which belt 51 is in turn driven by the sheave 52 which is mounted on the shaft 16. A suitable opening (not shown) is provided in the front of the cover-piece 46 to provide access for the belt 51. The chain sprocket 50 drives the chain 53, which in turn drives the sprocket 54. The sprocket 54 is secured to a sleeve 55 which fits around the tiller bar 33, and there is an annular shoulder 56 on the sleeve 55 to provide for sealing as will be hereinafter explained. The extreme end of the tiller bar 33 is machined to a taper over portion 57 and this is journalled in the thrust bearing 58 which sits in the housing cap 59 which is also formed in the cover-piece 46.

As the tiller bar works beneath the surface of the ground, it is necessary to provide an adequate seal for the bearing 58, and this is done as illustrated in FIGURE 5 (which shows an explosion of the sealing means in detail) by providing the two split rings 60 and 61 which are bolted into position around the annular shoulder 56 of the sleeve 55.

As will be observed best from FIGURE 3, the cover piece 46 is retained secure in position by a plurality of suitably disposed securing bolts. A suitable cover plate is also secured in position by bolts to close the feed chute 36 as indicated by numeral 62 in FIGURE 2.

The blade shaft 38 of the forward row of shoes is driven by the V-belt 63 from the pulley 64 which is secured to the shaft 16 and which drives the pulley 65 which is secured to the shaft 38 of the foremost row of shoes. The blade shaft 38 of the rearmost row of shoes is driven from the shaft 38 of the foremost row of shoes by means of a pair of pulleys 66 and 67 and the V-belt 68.

In order to stabilize the tiller assemblies against lateral wandering with respect to one another, the rear of at least one of the shoe members 32 in each assembly is guided by a channel-shaped guide 70 which is secured to the frame.

Also provided in association with the guides 70 are the stops 71 which are secured to the rear of the shoes 32 associated with the guides 70 and which limit the downward travel of the shoe assemblies by engagement with the top of the guides 70. The position of the stop 71 may be adjusted if it is desired to alter the maximum depth to which the seeds are planted.

Secured to the frame at the juncture of the braces 29, 30 and 31 is the hydraulic jack 72 which is supplied with hydraulic pressure from the prime mover by the hydraulic line 73. The piston 74 of the jack 72 works against the arm 75 of the bell crank lever 76 which is secured on the shaft 77, which latter is mounted in suitable borings in the rearwardly extending element 26 and 27 of the frame. The rearward arm of the bell crank 76 is connected to a cable 79 which is secured at its other end to a suitable point on the plate 39 which gangs the centre tiller assembly. Similar arm members to the arms 78 of the bell crank 76 are mounted at either end of the shaft 77 as indicated by reference numeral 80 (see FIGURE 1). These arm members 80 are similarly connected by a cable to the plate 39 of their respective tiller assemblies. Thus, when pressure is applied through line 73 the piston 74 rotates the bell crank 76 and the shaft 77 from the position shown in solid lines in FIGURE 2 to the position shown in dotted lines to raise the tiller assemblies clear of the ground to the position shown in dotted lines in FIGURE 2.

While the shoe 32a providing the drive for the tiller bar has been described in detail, it is not considered necessary to go into detail in connection with the construction of the other shoes 32 as their construction will be readily apparent to those skilled in the art, from the following description of the slight differences in construction which is involved. Firstly, as there is no drive mechanism involved in the shoes 32, there is no cavity for the chain 53. The centre shoe 32 in each row merely contains a conventional bearing for the shaft 38 and a conventional bearing for a sleeve similar to the sleeve 55 but having a shoulder 56 on either side thereof mounted on the tiller bar 33. In this instance, of course, sealing means similar to those shown in FIGURE 5 are provided on either side of the shoe. The end shoes of each row will have suitable journal bearing for the shaft 38 similar in nature to the bearing 45 and suitable journal bearings for the tiller bar 33, similar to those shown in FIGURE 3. In connection with the end shoes in each row, however, it should be observed that the blade 40 will be mounted on the reverse side of the shoe to that shown in FIGURE 4, and the journal bearing will be on the right-hand side of the shoe. The shoes 32b, as mentioned previously are similar to the shoes 32, but do not have the forwardly extending portion 34.

Packer Assembly

The packer assembly is made in two sections in the embodiment illustrated in the drawings, each of which contains nine packer wheels 90. The packer shaft 91 is square in cross section and with the exception of the drive wheels 90a (see FIGURE 6), the wheels 90 are provided with hubs 92 which are circular and which are rotatable on sleeves 93 which slip over the square shaft 91. Thus, the wheels 90 are independently rotatable. The packer wheels 90a have a square hub which fits directly over the shaft 91 and they are ganged together and secured to a chain sprocket 94 which drives the chain 95 which provides the necessary power to operate the seed metering device. The inner extremities of the shafts 91 have a cap 96 containing a bearing 97 and which is provided with the outwardly extending eye 98 which is used for connecting together the two packer assemblies. The outer extremities of the assemblies are merely capped in conventional manner as indicated at 99 on FIGURE 1. Immediately to the outside of the drive wheels 90a is the bearing 100 which is rotatable about the sleeve 101 which is slidable on the square shaft 91. The bearing 100 is secured to the chassis member 102 which is secured at one end to the lower extremity of rearpost 28 and at its rearward extremity to the brace 103, which latter extends from there to connect with the top of the rearpost 28. At this point, the transmission shaft 104 is mounted in the frame and carries the two chain sprockets 105 and 106. The former is driven by the chain 95 and the latter drives the chain 107 which connects directly to the drive sprocket 108 of a conventional seed metering device situated at the base of the seed box 109. The seed box is conventional and is supported on the rearwardly extending members 26 and 27 of the frame. It communicates through a plurality of telescoping spouts 110 and 111 with each of the seed chutes 36 at the rear of the shoes 32 and 32a.

The remainder of the chassis for the packer wheels is formed by the cross members 112 and 113. There are hinged as at 114 to the chassis member 102. At their other ends, the chassis members 112 and 113 are connected by the spacer 115 and provided with the pin-socket ears 116 and 117 which are arranged to mate in the manner shown with corresponding socket ears 118 and 119 formed in the corresponding chassis members 120 and 121 of the other packer assembly. The two assemblies are held together by means of a pin 122 which passes through the socket ears 116, 117, 118 and 119 and also through the eyes 98 on the cap 96 of the adjacent ends of the axles 91. The packer assemblies are thus free to pivot vertically in respect of each other about their respective chassis members 102 to take into account any variation in the terrain over which the implement is passing.

Operation

When the apparatus of the invention has been taken to the desired location, the seed box 109 is filled and the pressure in the hydraulic line 73 is released permitting the tiller assemblies to be lowered until the bottom edge of the shoes rest on the surface of the ground. The tractor will be hitched to the plate 12 in the position which experience has shown is most satisfactory from the point of power consumption and ease of control in the terrain which is to be seeded. The power take-off is engaged and rotates the shaft 16 through the gear box 23 and the belt drive 26. This causes rotation of the blade 40 by means of the belt drive 63 and 68. At the same time, the tiller bar 33 is rotated in the opposite direction (i.e. with its forward edge moving upwardly) through the crossed belt drive 51 and the chain drive 53. As the implement is now advanced over the soil, the plough points 32c cut through the sod and carry the tiller bar 33 into the ground to a depth of two or three inches.

Figure 7:
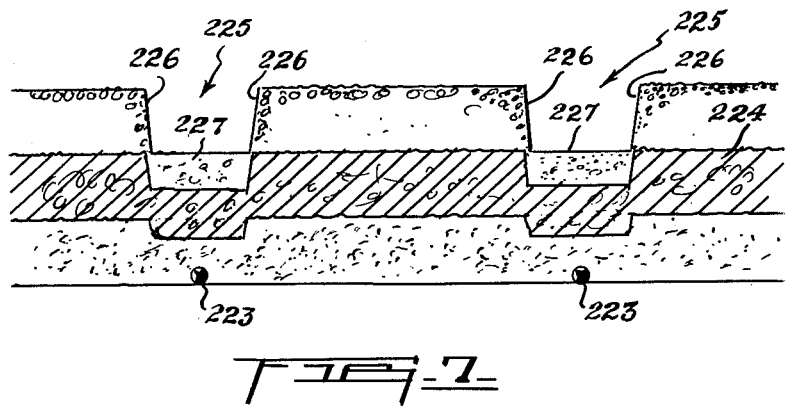
FIGURE 7 is a vertical section taken through a seed bed prepared in accordance with the method of the present invention illustrating the condition in which the seed bed is left.

As the implement advances, the packer wheels rotate and operate the seed metering device through the chain drives 95 and 107. The furrows cut by the plough point on the front of the shoes are neat and clean and seeds are deposited in the bottom of the furrows which then tend immediately to close up again. At the same time, the tiller bar 33 moves through the soil at a point which is approximately an inch and a half above the point at which the seed is deposited and its rotation causes a mulching of the soil leaving a bed of prepared much approximately an inch thick. The packer wheels being in alignment with the shoes pack a strip of surface which is centred on the furrow formed by the shoe immediately in front of the respective packer wheel, and the result is that the seed bed is left in uniform condition substantially as illustrated in FIGURE 7 where the seed 223 lies in the soil at the appropriate depth with a bed of mulch 224 above it and a packed furrow 225 centred immediately over the seed. The surfaces of the packed furrow left by the packer wheels are packed but as will be observed, they slope inwardly slightly so that a good deal of the pressure of the packer wheels is expended in a lateral direction. This packs the sides 226 of the furrows reasonably hard but minimizes the amount of packing done on the bottom 227 of the furrows so that the mulch in the layer 224 immediately beneath the furrows is not compacted to any appreciable extent.

As the implement progresses along the ground, any tendency to pick up debris or turf and drag it along is eliminated by the fact that all trash lying on the surface or in the surface layers of the ground is cut neatly through by the rotating blade 40 in cooperation with the knife members 43.

Under normal conditions, the tiller assembly will be self-adjusting as to depth depending upon the point at which the hitch to the tractor is made in much the same manner as a conventional plough. Under some conditions, however, the rotation of the tiller bar 33 may tend to drag the assembly downwards to a greater depth than is desired. Under these conditions, use of stops 70 and 71 will prevent the assembly from digging deeper into the ground than is desired.

Referring more particularly to FIGURES 8, 9 and 10 the preferred form of implement therein illustrated comprises the rectangular box-type frame 200 which is preferably of welded steel construction. To the front end of the frame 200 is connected the draft-bar 201 which is braced by the struts 202 and 203. Mounted on the front of the draft-bar 201 is the draft-plate 204 with a plurality of draft-eyes 205 by means of which the implement may be fixed to a tractor in adjusted position.

The packer assembly 206 is mounted directly on the frame 200 in a manner best illustrated in FIGURE 9. As will there be observed the frame element 207 supports self-aligning bearing housing 208 in which is mounted the shaft 209 of the packer assembly. The ends of the shaft 209 are journalled in spherical bearings 209a which are mounted in cross-heads 209b which are slidable within vertical guides 209c which are secured to the frame 200. This construction permits the packers to follow unevenesses in the ground. Otherwise then as indicated the preferred embodiment packer assembly herein described is similar to that described in the main disclosure.

The seeder-box 210 with its associated feed metering device 211, telescopic seed delivery tubes 212 is generally similar to that described in association with the principal disclosure, the drive for the seed metering device is taken off the packer shaft by sprocket 180 mounted adjacent the self-aligning bearing 208. The chain 213 drives the drive shaft 213a which is mounted on top of the frame 200 above the packer assembly, and the chain drive 213b drives the seed metering arrangement through a conventional dog-toother clutch arrangement 215 which is connected through links 216 to the manual control lever 217. Actuation of the lever 217 engages or disengages the clutch 215. It will also be observed that the telescoping seed chutes 212 are hinged at 218 at their forward side in order to enable proper telescoping when the tiller and feeder assembly is raised to the position indicated in dotted lines in FIGURE 8.

The preferred form of shoe construction is illustrated in FIGURE 10. The rear edge of the shoe embodies the terminal portion 220 of a seed delivery tube 212 which slopes forwardly at an angle to the vertical of approximately 25°. The forward edge 221 of the shoe slopes rearwardly at an angle of approximately 35° to the vertical so that straw, and other debris will easily be raised up it as the implement advances. The cutter blade 222 is mounted on the cutter shaft 123 and rotates clockwise as indicated by the arrows. The blade 222 has two sickle shaped knife elements 124 which pass upwardly between the closely spaced steel side plates of the shoe. The tiller bar 126 is driven from the idler shaft 127 which is driven from the cutter bar shaft 123. The cutter bar shaft 123 is driven by belt drive 222a by pulleys 131b which are keyed thereto. The drive shaft 129 is driven by pulley 131 by means of belt drive 131c and pulley 131a, the latter being driven from the power take-off through mitre gear box 131. As before the shoes are arranged in staggered rows and only those in one of the rows need to be equipped with a tiller bar 126. Those shoes not equipped with a tiller bar 126 will be similar to the shoe illustrated in FIGURE 10 with the exception that the idler shaft 127 and tiller bar 126 and associated drive mechanism is absent. Where the shoes are arranged in sections containing odd numbers of shoes in staggered rows, the shoes in the row containing the largest number of shoes will carry the tiller bar.

An alternative feature which is preferably included is the straw tedder shaft 150 on which are mounted tedder tynes 151 and 152 (see FIGURE 8a), there being a pair of tynes positioned on the shaft 150 directly in front of each shoe. The tedder shaft 150 is journalled in brackets 153 which are secured to the frame 200. The tedder shaft is driven by pulley 154 in the direction indicated by the arrow by the belt drive 155 which is driven by a pulley mounted on the cutter bar shaft 123. The three shafts 150, 123 and 127 and their associated belts are preferably protected from fouling by loose straw and the like by means of a sheet metal shield suitably provided with slots for the passage of the drive belts and tedder tynes and secured to the outer shoe assemblies at either side of each section. The position of the shield 156 is indicated in dotted lines in FIGURE 9, but the shields are not shown in FIGURE 8 in order not to obscure details of the shoe assembly and drive means.

A principal feature of the preferred embodiment of implement described herein is the suspension of the shoe assembly or assemblies. Referring to FIGURE 8 it will be observed that the shoe assemblies are drawn from the main shoe draw bar 129 upon which the individual draw bars 133 are pivotally mounted. Mounted on the frame in association with the toothed segment 134 in the manual adjustment lever 217 on the lower end of which is the lever arm 135 to which is secured the cable 136 which is attached to the tiller assembly at 137. It will be observed that with the lever in the forward position as represented by the dotted lines the tiller assembly will be raised free of the ground to the position shown in dotted lines and the seed box drive will be declutched. On the other hand when in the rearward position illustrated in solid lines the tiller assembly will be lowered into contact with the ground. Furthermore, the depth to which the tiller assembly will cut into the earth may be adjusted by adjusting the position in which the lever 217 is locked to the segment 134. Should obstructions be encountered during operation the cable 136 permits the tiller assembly to ride up over such obstructions without damaging the structure of the implement. The positioning of the lever 217 may be regarded as controlling the maximum depth to which the tiller assembly will penetrate the earth.

In practice, it is desired that the shoes should have sufficient "pick" to penetrate the surface of the ground but that they should ride at the desired depth without any pronounced downward pull so that obstructions such as stones and roots will cause the assembly to ride upwardly. The desired depth is adjusted by the positioning of the lever 217 and the correct degree of "pick" is achieved by selection of the appropriate draft-eye 205 in hitching the implement to the prime mover.

A further feature of the preferred structure herein described is the versatility of function for which a particular implement may be specifically designed. Normally speaking where the implement is to be used in terrain which is free from heavy roots and rocks the shoes may be ganged in sections of five to seven as illustrated in FIGURE 9. With such an arrangement the tiller bar 126 will be mounted in the rear row of staggered shoes in one section and in the front row of shoes in the adjacent section. For rough ground and ground which contains stones, roots and other obstructions the shoes may be mounted in sections of three with the tiller bar in the forward staggered row as illustrated in FIGURE 9b. In this instance the shoe sections are light and easily ride over obstructions without damage. On the other hand if it is desired to employ the implements of the present invention for row cultivation the sections may consist of individual shoe elements spaced apart whatever distance is desired between rows in the manner illustrated in FIGURE 9a.

Where the straw tedder feature is incorporated in the implement, its action in brushing straw rearwardly with the tynes 151 and 152 makes for a more even feeding of straw to the cutter blades 122 and by throwing straw to the rear between the shoes prevents overloading of the cutters which may be caused by accumulations of straw or like debris which are on the ground over which the implement is being drawn.

Those familiar with agricultural art will appreciate from the foregoing that the invention in addition to the advances already mentioned overcomes a disadvantage inherent in most present-day agricultural implements which is viewed with some concern by soil conservationists. Soil tilling implements in which the soil tilling elements are ranged have a universal tendency to collect stubble or other crop residue and this tendency has led to an almost universal practice of eliminating the stubble or other residue by burning the same with the result that the soil is deprived of the organic matter which would otherwise be returned to it and is subject to more rapid exhaustion than would otherwise be the case. By providing cutters which cut through the stubble and leave it on the surface of the soil, the tilling implement of the present invention provides an outstanding advance in soil husbandry whereby the natural crop residues may each year be returned to the soil to replenish the organic matter so necessary to ensure continued crop yields without in any way hampering subsequent tilling and seeding operations.

While I have described the operation of the implement as a tiller-seeder-packer combine, it will be appreciated that it may be used, if desired, simply as a tilling and packing combine merely by leaving the seed box 109 empty during the operation, or if desired, it may be used simply as a tiller by leaving the seed box empty as just mentioned and by replacing the packer assembly with one or more pairs of wheels mounted on the same axle as that on which the tiller assembly is mounted.

What I claim as my invention is:

1. An agricultural implement comprising a frame supported to the rear for movement over the ground by a prime mover connected to the front thereof; a plurality of transversely aligned shoe members, each said shoe member being connected to the frame and formed with a plough shaped point for breaking ground, each said shoe member comprising a seed chute having a delivery point at the lowermost portion of the rear of said shoe; means secured to said frame for delivering seed to said seed chute; a tiller member mounted for rotation in said shoe members and extending therebetween, said tiller member comprising a tiller bar extending between the shoes in position to work beneath the ground surface and to leave the surface substantially undisturbed; drive means mounted in a shoe member for rotating said tiller member in a direction imparting upward motion to the forward side thereof; and packing means comprising a plurality of packer wheels, each said packer wheel being mounted from said frame to the rear of and in alignment with a shoe member whereby to pack a strip of ground centered on a furrow cut by said shoe member.

2. An agricultural implement as defined in claim 1 wherein the shoe members are pivotally secured to draft bar means positioned well forwardly of the earth engaging points of the shoe member, and wherein means are provided for adjusting the elevation of the ground engaging parts of the shoe member, said means being mounted on the frame substantially above said shoe member and arranged to pivot the shoe member about said draft bar means, and including means permitting the shoe member to ride above its position of adjustment under the influence of forces applied through the ground engaging parts thereof.

3. An agricultural implement comprising a frame supported to the rear for movement over the ground by a prime mover connected to the front thereof; a plurality of shoe members, each said shoe member being formed with a plough shaped point for breaking ground; said shoe members being mounted on said frame and positioned in at least two transverse rows, the shoe members of said rows being staggered, one of said rows being wider than the other; each said shoe member comprising a seed chute having a delivery point at the lowermost portion of the rear of said shoe; means secured on said frame for delivering seed to said seed chute, a tiller member mounted for rotation in the shoe members of at least the wider of said rows, said tiller member comprising a tiller bar extending between the shoes in said row in position to work beneath the surface of the ground without considerable disturbance of the surface between said shoe members; drive means mounted in one of said shoe members for rotating said tiller member in a direction imparting upward motion to the forward side thereof; and packing means comprising a plurality of packer wheels, each said packer wheel being mounted from said frame to the rear of and in alignment with a shoe member whereby to pack a strip of ground centered on a furrow cut by said shoe member.

4. An agricultural implement comprising a frame supported to the rear for movement over the ground by a prime mover connected to the front thereof; a plurality of transversely aligned shoe members, each said shoe member being connected to the frame and formed with a plough shaped point for breaking ground, each said shoe member comprising a seed chute having a delivery point at the lowermost portion of the rear of said shoe; means secured to the frame for delivering seed to said seed chute; a tiller member mounted for rotation in said shoe members and extending therebetween, said tiller member comprising a tiller bar extending between the shoes in position to work beneath the ground surface and to leave the surface substantially undisturbed; drive means mounted in a shoe member for rotating said tiller member in a direction imparting upward motion to the forward side thereof; a knife member secured to said shoe behind said point and extending at an angle therefrom in a position to intercept debris raised by said point; a tooth blade rotatably mounted on said shoe member for rotation adjacent said knife member to co-operate therewith to cut said debris; drive means mounted on said shoe for rotating said blade; and packing means comprising a plurality of packing wheels, each said packer wheel being mounted from said frame to the rear of and in alignment with a shoe member whereby to pack a strip of ground centered on a furrow cut by said shoe member.

References Cited in the file of this patent

UNITED STATES PATENTS

| | | |
|---|---|---|
| 408,378 | Cummings et al. | Aug. 6, 1889 |
| 989,725 | Rodgers | Apr. 18, 1911 |
| 1,226,515 | Hicks | May 15, 1917 |
| 1,460,236 | Ford | June 26, 1923 |
| 1,865,898 | Glasier | July 5, 1932 |
| 1,901,298 | Johnson | Mar. 14, 1933 |
| 2,355,229 | Miller | Aug. 8, 1944 |
| 2,364,958 | Drennan | Dec. 12, 1944 |
| 2,528,270 | Fundingsland | Oct. 31, 1950 |
| 2,572,298 | Alvarez | Oct. 23, 1951 |
| 2,577,363 | Poynor | Dec. 4, 1951 |
| 2,767,631 | Mowbray | Oct. 23, 1956 |
| 2,812,732 | Meisdalen | Nov. 12, 1957 |
| 2,886,113 | Sorensen et al. | May 12, 1959 |

FOREIGN PATENTS

| | | |
|---|---|---|
| 426,642 | Canada | Apr. 10, 1945 |

OTHER REFERENCES

Farm Implement News, vol. 75, No. 11, June 10, 1954, pp. 60, 61, 103. Article "Beating Soil Erosion" by Emerson.